May 14, 1946.  M. KATCHER  2,400,201
OIL FILTER
Filed March 6, 1943   3 Sheets-Sheet 1
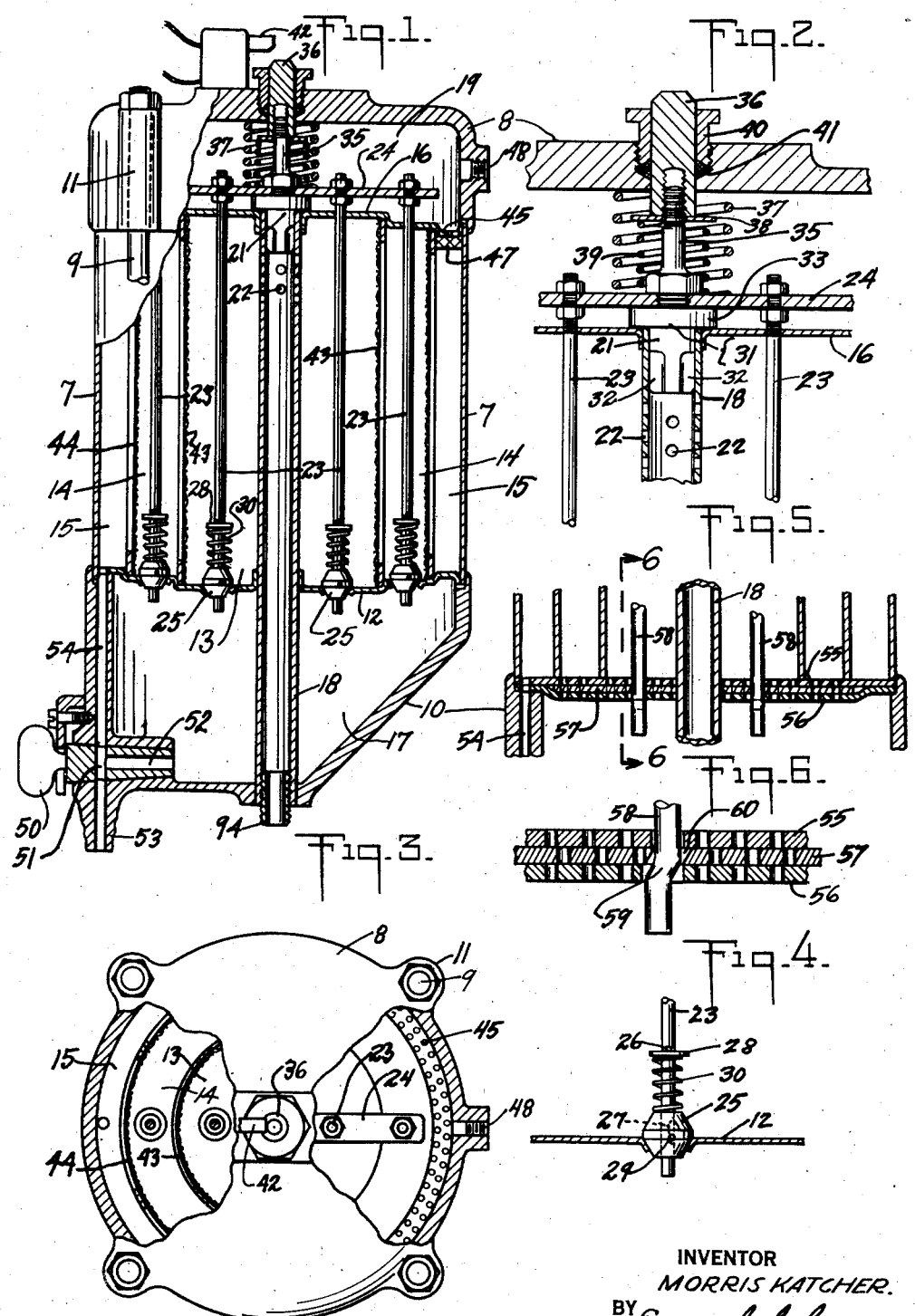
INVENTOR
MORRIS KATCHER.
BY Emanuel Scheyer
ATTORNEY

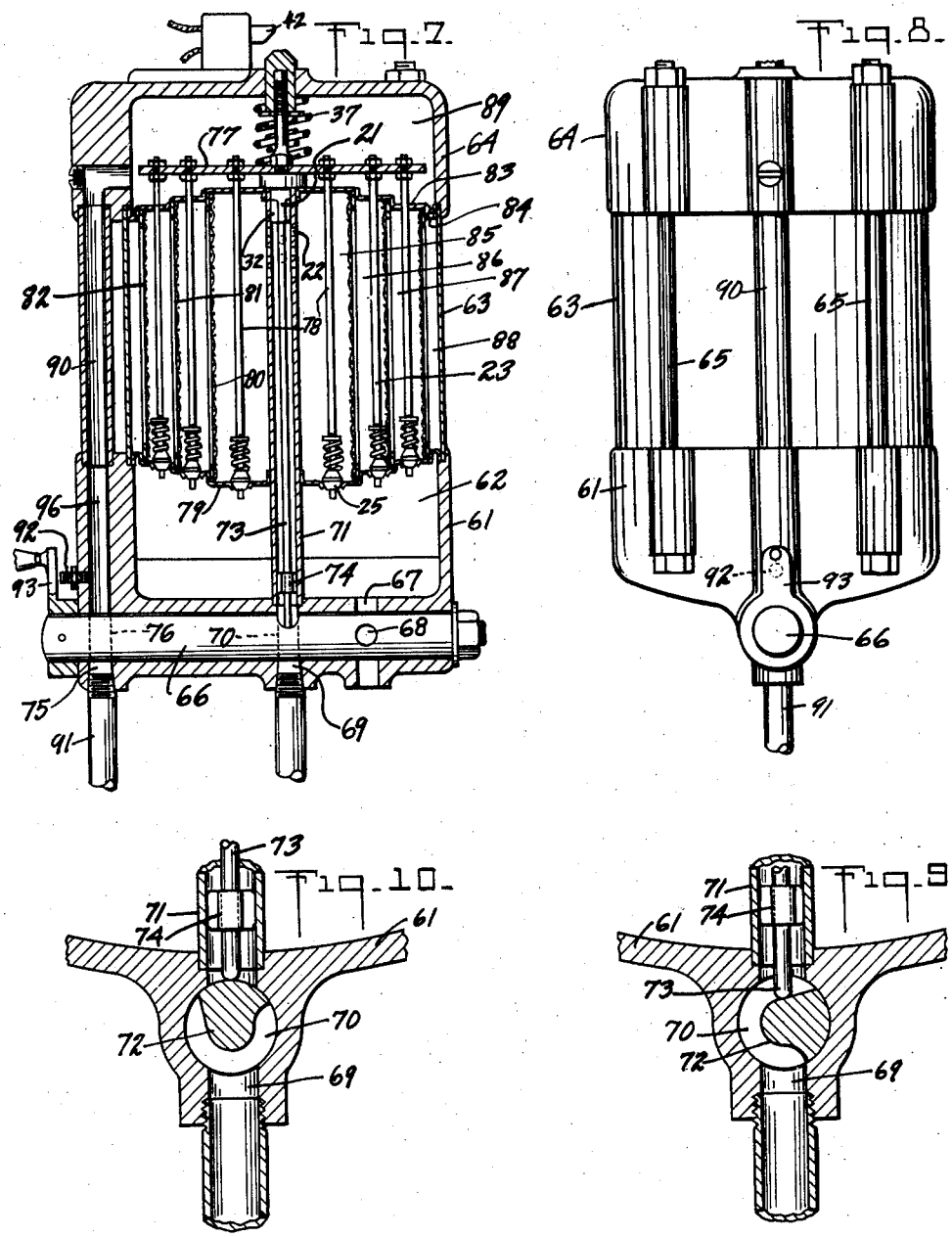

May 14, 1946. M. KATCHER 2,400,201
OIL FILTER
Filed March 6, 1943 3 Sheets-Sheet 3
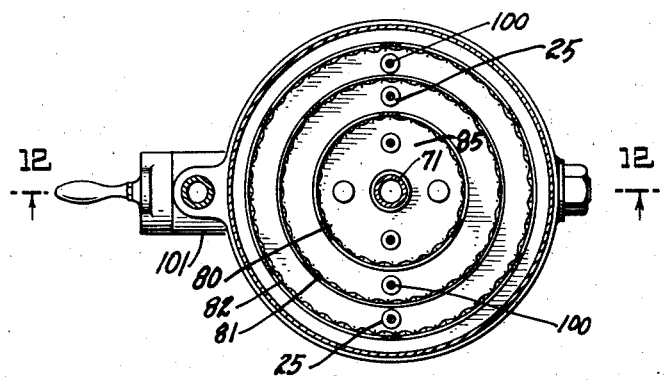
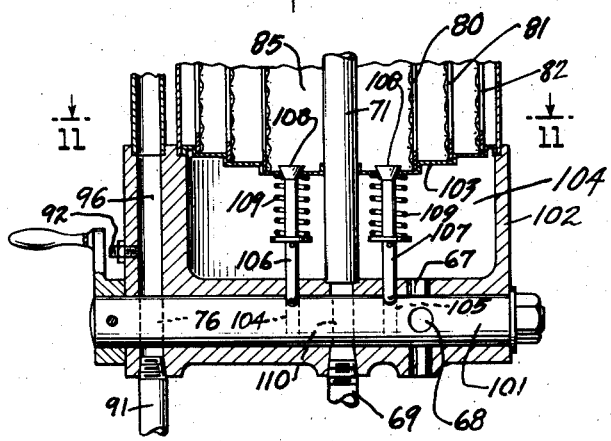
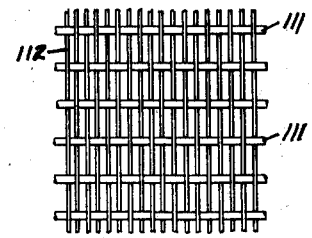
INVENTOR
MORRIS KATCHER.
BY
Emanuel Scheyer
ATTORNEY Patented May 14, 1946

2,400,201

UNITED STATES PATENT OFFICE 2,400,201

OIL FILTER

Morris Katcher, New York, N. Y.

Application March 6, 1943, Serial No. 478,224

17 Claims. (Cl. 210—165)

This invention relates to an oil filtering device which when clogged will remove by itself the accumulated sludge from the filtering layers. The particles of impurities filtered out by the layers settle back therefrom to a floor, forming sludge thereon. After a while, as more and more sludge is accumulated on the floor, blocking the filtering layers, the passage of oil through the filter is increasingly resisted. The oil filtering device is used where the oil is sent through it under pressure, as in the lubricating system of an internal combustion engine where it is especially useful. Increased resistance, therefore, to the passage of the oil through the filter builds up the pressure in the device, until a pressure controlled valve acts to open up the floor for dumping the sludge therefrom into the sump. When the sludge is removed, the layers are cleared for the passage of oil through them, reducing the pressure in the device and allowing the floor to close. This is repeated until the sump is filled with sludge, at which time the sump must be emptied. A cleanout opening is provided for the sump which is manually operable.

The filtering layers are preferably substantially vertical, so that particles of impurities filtered out will drop away or settle from them. Said layers may be set other than vertical so long as they are set with a steep enough angle that the particles will settle or slide off from them. The side of the layers or walls receiving the oncoming oil must make an angle with the horizontal which is steeper or greater than the angle of repose of the sludge. In fact this angle can be so steep that the layer can be horizontal with its oil receiving side underneath. The angle could also be less than 90 degrees between the horizontal and the layer with its oil receiving side on top, so long as the sludge will slide off.

The oil is caused to pass through successive walls or layers, succeeding walls having interstices less in size than the ones preceding them. The finer particles of impurities in the oil, as the latter normally flows through the walls, pass through the walls with the coarser openings, which come first in the path of the oil, until they reach a wall with openings or interstices small enough to stop them. The variation in the size of the interstices noted, also increases the time between which it is necessary for the pressure controlled valve to effect the clearing of sludge from the floor because the smaller particles are prevented from clogging the walls with the larger interstices which come first in the path of the oil. The smaller particles penetrate the outer walls until they are stopped by a wall with small enough interstices in the interior where they settle to the floor. This spreads the sludge.

When the sump is filled with sludge, the self-cleaning action is no longer effective. A further increase in pressure in the device is then developed which operates the valve to bypass the oil around the walls. At this time, a telltale is also acted upon which indicates that the sump needs draining.

Construction is also provided to blow air or other cleaning fluid through the device in reverse direction to clean the walls when they become clogged, from continued use, by the particles of impurities which stick to them instead of settling away from them.

Other objects and advantages will become apparent upon further study of the description and drawings, in which:

Fig. 1 is a vertical section through the filter, a portion being shown in elevation.

Fig. 2 is a fragmental vertical section to an enlarged scale for the portion of the filter adjacent the bypass valve.

Fig. 3 is a top plan of the filter, a portion of the cap being cut away to show the interior.

Fig. 4 is an enlarged view of one of the cleanout valves.

Fig. 5 is a section through the floor of the filter chamber showing an alternate design in which a sliding plate controls the cleanout openings.

Fig. 6 is a partial section of the filter chamber floor to an enlarged scale at the shift rod and is taken along the line 6—6 of Fig. 5.

Fig. 7 is a vertical section through a modified form of the filter in which the last and finest filter layer instead of being horizontal and at the top of its compartment is substantially vertical and concentric with the other filter layers or walls.

Fig. 8 is an elevation of the filter of Fig. 7 looking at the filter turned 90 degrees from that shown in Fig. 7.

Fig. 9 is a partial section through the bottom of the filter of Fig. 7 at the cam portion of the multi-port valve, said cam portion being in the position for the closing of the floor of the filter compartments.

Fig. 10 is a partial section taken similarly to Fig. 9 but shows the cam portion in the position for the freeing of the openings in the floor of the filter compartments, for the escape of whatever sludge has settled on said floor.

Fig. 11 is a sectional plan taken along the line

11—11 of Fig. 12 showing a modified form of the device, the tie bolts and sleeves being omitted.

Fig. 12 is a partial vertical section taken along the line 12—12 of Fig. 11, and Fig. 13 is an elevation to an enlarged scale of a portion of one type of filtering wall or screen.

The filter housing comprises a cylindrical sheet metal shell 7, a cast iron cap 8 and a cast iron base 10. These three parts are held together by tie bolts 9. The upper part of each bolt 9 is held in a sleeve 11 formed on cap 8. Similar sleeves, not shown, are provided in base 10 to take the bottom of bolts 9. A plate 12 extends across the filter forming the floor of the filter compartments 13, 14 and 15. A roof plate 16 extends across the filter forming the top of said compartments. Cylindrical compartment 13 is contained within the cylindrical wall of filter material 43. Annular compartment 14 is contained within cylindrical walls 43 and 44 of filter material, while annular compartment 15 is contained within wall 44 and casing 7. Inside of base 10 is chamber or sump 17. A tube 18 extends through the bottom of base 10 up through sump 17, plate 12, compartment 13 and plate 16. The lower end of tube 18 is provided with a sleeve 94 to provide a connection with the pressure side of a lubricating system (not shown). The upper end of tube 18 communicates with escape chamber 19 when valve plug 21 is lifted a sufficient amount as will be explained. Near the top of tube 18 are perforations 22 for the passage of oil from said tube into compartment 13. Valve rods 23 depend from cross bar 24 and are fixedly attached thereto. Valve heads 25 are slidably mounted on the bottom of rods 23. The sliding of heads 25 is limited in extent by pins 29, the inside ends of which slide in slots 27 formed in rods 23. Each rod 23 has mounted thereon a washer 28 which is limited in its upward motion by pin 26 set in the rod. Between the top of head 25 and washer 28 is a compression spring 30 normally holding said head in its lowest position on rod 23. Because of this spring pressed sliding mounting of heads 25 when bar 24 is in its lower position, all heads are properly seated in their openings in plate 12.

Slidably mounted in the upper end of tube 18 is a valve denoted in its entirety by the numeral 31. Valve plug 21 which forms the lower part of valve 31 is provided with flutes 32. Above valve plug 21 is a collar 33 which limits the downward motion of the valve. Bar 24 is held down on collar 33 by bolt 35, the latter at its upper end having a plug 36 threadedly mounted thereon for adjustability. Between bar 24 and the underside of cap 8 is mounted compression spring 37, normally holding down said bar and with it valve heads 25 on their seats in plate 12. The lower end of plug 36 is provided with a flange 38 between which and bar 24 is located a compression spring 39. The upper end of plug 36 is slidably mounted in stuffing-box sleeve 40. Sleeve 40 is threaded in an opening in the top of cap 8, extra space being provided for packing 41. The top of plug 36 is beveled for suitable engagement with a mating bevel on switch finger 42. When plug 36 rises enough to push against finger 42, a telltale or signal, not shown, is actuated which indicates that the filter is clogged and needs cleaning.

Oil is fed under pressure, say from the lubricating system of an internal combustion engine, into the bottom of sleeve 94 and tube 18. The oil passes out of tube 18 through perforations 22 near its top entering inner compartment 13. From said compartment, the oil passes through the cylindrical wall 43 into filter compartment 14 and then through cylindrical wall 44 into filter compartment 15. Plate 16 is provided with perforations 45 over the top of compartment 15. Below perforations 45 in plate 16 is a ring 47 preferably of felt, through which the oil passes before it leaves compartment 15 through said perforations. From compartment 15 the oil passes into chamber 19 and thence out outlet 48, through a tube (not shown) to the lubricating system.

Cylindrical walls or layers 43 and 44 are of screen or other filtering material, the same principle being employed herein as in my copending application, Serial No. 468,044, in which the interstices of successive layers of filtering material become smaller. In the present instance, the interstices of felt ring 47 are the smallest, those of wall 44 larger and those of wall 43 the largest. The openings, interstices or pores become smaller the nearer the filtering material is to where the oil leaves the filter, considering a flow of oil passing through same. The finer particles of impurities in the oil, as the latter normally flows through the material, pass through the coarser openings near where the oil enters until they reach openings small enough to stop them. Particles of larger size are stopped before they have traveled through as far as the finer particles. This variation in the size of the interstices increasing the filtering capacity because it tends to prevent the smaller particles from clogging up the filter at the side where the oil enters by permitting said smaller particles to pass through until they meet with a finer layer. By so passing they move away from the entrance leaving it free to handle the larger particles only. When the normal flow is reversed through the filter for cleaning, the particles are able to pass backwards through the successive layers of filtering material as said particles reach openings increasing in size.

As the particles carried along by the oil in its normal flow through the filter reach a filtering layer with interstices small enough, said particles are stopped. The stopped particles gradually settle down to the floor plate 12 at the bottom of the filter compartments 13, 14 and 15.

The volumetric capacity of the compartment opposite the finer filtering layer, is less than that of the compartment opposite the coarser layer, as can be seen. Said capacity is less for compartment 15 opposite the finest filter layer 47, than for compartment 14 opposite coarser layer 44. The capacity of compartment 14 is less than for compartment 13 opposite still coarser screen 43. When the filtering layers 43, 44 and 47 become blocked enough by the piling up of sludge on the floor, the pressure of the oil inside the filter will raise valve 31 against the pressure of spring 37. Before said valve is raised enough so that the tops of flutes 32 are above plate 16, cross bar 24 is lifted so that valve heads 25 are unseated, allowing the escape of the sludge that has settled on plate 12 into sump 17. This will clear to a great extent the surfaces of filtering layers 43 and 44 allowing the oil to flow through them for normal filtering. When this occurs, the pressure drops in the filter allowing valve heads 25 to seat.

It will be noted that the lifting of valve heads 25 does not open the bottom of compartment 15. Filter compartment 15, therefore, is not cleared of its sludge at this time, but because very little sludge reaches it after having passed layers 43 and 44, the filter can operate a long time before it becomes necessary to clean said compartment.

The self cleaning action just described keeps on repeating until sump 17 becomes filled. When this happens there can be no relief of pressure. Then valve plug 21 lifts far enough for the top of flutes 32 to rise above plate 16. When this occurs oil is bypassed from tube 18 through flutes 32 into chamber 19. Further lifting of valve plug 21 causes top plug 36 to engage switch arm 42 which operates a signal or telltale, not shown, to indicate that the filter is bypassing the oil instead of cleaning it.

When this occurs, sump 17 is cleaned by manually opening petcock 50. Petcock 50 has two passages therethrough, one extending axially, passage 52, and the other transversely, passage 51. The sludge in sump 17 goes through passage 52 into passage 51, leaving the filter through nozzle 53. With petcock 50 turned as shown, passage 51 connects with drain passage 54 extending through sump 17 and draining outer filter compartment 15. Turning petcock 50 around 90 degrees from that shown, closes off sump 17 and passage 54.

A modified form of self cleaning construction is shown in Figs. 5 and 6. The floor in this form consists of two perforated plates, upper plate 55 and lower plate 56, the perforations of these plates being in alignment. As long as the pressure in tube 18 remains low enough not to raise valve plug 21 with its cross bar against the pressure of spring 37, perforated plate 57, slidably mounted between plates 55 and 56, is in such position that its land portions block off the perforations in said plates, so whatever sludge has settled upon plate 55 is prevented from escaping. Extending downward from a cross bar, not shown, which is similar to bar 24, are two rods 58, near the lower end of each of which is an inclined offset portion 59 passing through opening 60 in sliding plate 57. The sides of opening 60 are inclined. When increased pressure raises valve plug 21 with its cross bar, it pulls up rods 58 so that offset portion 59 engages the inclined sides of opening 60 and slides plate 57 to one side so that its perforations are in alignment with the perforations of plates 55 and 56. When this occurs, the sludge on plate 55 drops into the sump freeing an area of filter layers or walls 43 and 44 and hence causing a drop in pressure in the filter. This allows rods 58 to move downward causing their offset portions 59 to move plate 57 to block off the perforations of plates 55 and 56.

In Figs. 7–10, the modified form of filter shown has a housing comprising a lower casting 61 which contains sump 62. A sheet metal substantially cylindrical shell 63 extends between lower casting 61 and upper casting 64. The three parts are held together by tie bolts 65.

The floor of casting 61 is bored for rotatably mounting valve stem 66. An opening 67 in lower casting 61 is provided for draining sump 62. Stem 66 has a port 68 therein which can be placed in register with opening 67 when it is desired to drain the sump. As shown in Fig. 7, port 68 is across opening 67, in which position stem 66 prevents escape of material from sump 62. Another opening 69 is provided in lower casting 61 for the entrance of the oil under pressure into the filtering device. Stem 66 has a substantially semicircular port or groove 70 on line with opening 69, which when stem 66 is turned as shown in Figs. 7, 8 and 9 permits the oil to enter tube 71. One side of groove 70 is formed as a cam 72 on which the bottom of valve extension 73 rides. Said extension slides in a bearing 74 near the bottom of tube 71, while the upper end of the extension is fastened to valve plug 21. With cam 72 turned to the position shown in Fig. 9, that is with opening 69 free to receive the oil under pressure, extension 73 is in its lowest position allowing valve plug 21 to close the top of tube 71. With valve stem 66 turned 90° from that shown in Fig. 9 to the position shown in Fig. 10, it closes off opening 69. An opening 75 and passage 96 are provided in casting 61 for the outlet of the oil from the filter. Valve stem 66 has a port 76, which when placed in register with passage 96 and opening 75, as is the case in Fig. 7, permits the oil to discharge from the filter through outlet 91. Valve plug 21 is mounted in the upper end of tube 71 just as in tube 18 Fig. 1. It functions to bypass the oil by means of its flutes 32 when the pressure in tube 71 is sufficient to raise plug 21 against the pressure of spring 37. Attached to valve plug 21 is a cross bar 77 from which depend valve rods 78 which carry valve heads or stoppers 25 at their lower ends just as rods 23 in Fig. 1. Floor 79 under walls or layers of filtering material 80, 81 and 82, has openings in which stoppers 25 are normally seated. Above said walls is a roof plate 83, forming with the walls and floor plate 79 a plurality of compartments 85, 86, 87 and 88, one within the other as in Fig. 1, except that in the latter figure there are only two cylindrical walls, walls 43 and 44, of filtering material, the outer annular compartment 15 having a ring of felt 46 on top of it. In Fig. 7 there is no felt ring at the top of the outer compartment, only perforations 84 in roof plate 83 being present, and the felt layer, or layer having the finest interstices is cylindrical wall 82. Compartments 85, 86 and 87 each have two openings in floor plate 79 adapted to receive stoppers 25. Above roof plate 83 is a chamber 89 which receives the oil from perforations 84. Leading from chamber 89 is a discharge tube 90 which connects with discharge passage 96.

In operation, oil enters the filter through inlet 69 passing through port 70 in valve stem 66, up tube 71, out through perforations 22 near the top of the tube into inner filter compartment 85. The oil then passes successively through filtering walls 80, 81 and 82 into outer compartment 88 from whence it leaves through perforations 84. The oil passing through perforations 84 enters chamber 89, passing out therefrom down tube 90, passageway 86, port 76, opening 75 and outlet 91. The interstices in filtering layers 80, 81 and 82 become successively finer, one with respect to the other, starting with inner layer 80 as the coarsest. Particles of impurities in the oil on its way through the successive walls being stopped in accordance with the size of the particles, the coarser particles being stopped by wall 80, next finer particles by wall 81 and the finest particles by wall 82 which may contain felt. The separated out particles settle to floor plate 79 accumulating thereon as sludge. After a while so much sludge accumulates on the floor that it piles up on the filter walls cutting down their available openings or interstices. This increases the pressure of the oil in the filter, causing valve plug 21 to be lifted, raising with it cross bar 77 and lifting rods 23, stoppers 25 from their openings in floor plate 79. This allows the sludge to escape into sump 62, clearing considerable of the interstices in the filter walls 80, 81 and 82 and hence causing a drop in oil pressure, letting valve plug 21 move down thereby under the influence of its spring 37 and gravity. The openings in floor 79 then become closed by stoppers 25. Under these conditions the oil passes through the filter again for the normal filtering operation. When walls 80, 81 and 82 become clogged or gummed or sump 62 filled, there is no more any relief in pressure possible, so that valve plug 21 is lifted high enough for its flutes 32 to bypass the oil into chamber 89 without passing through the filtering layers. As in Fig. 1, when valve plug 21 rises to its bypassing position it operates telltale or switch finger 42 to show that the filter needs manual cleaning or the sump to be emptied. By turning valve stem 90 degrees from that shown in Fig. 7, inlet opening 69 and outlet 91 are closed off from the lubricating system and sump 62 drained through opening 67. In turning valve stem 66, crank handle 93 is moved from in front of air inlet 92. Air inlet or connection 92 has inside of it (not seen) the usual air check valve, as on a tire, permitting the ingress of air or other fluid, but not its egress. Air or other cleaning fluid under pressure can then be blown or forced into the filter. The turning of valve stem 66 raises valve extension 73 and with it valve plug 21, cross bar 77 and stoppers 25. Air then blown into air inlet 92 passes up passage 96 and tube 90 into chamber 89, leaving there through perforations 84. From perforations 84, the air enters outer compartment 88, passing through walls 82, 81 and 80 in reverse direction from the normal oil flow and out through the openings in floor plate 79 into sump 62, leaving there through opening 67. This will clean the walls of the filtering layers from impurities stuck to them.

The lifting of valve extension 73, when valve stem 66 is turned 90 degrees from that shown in Figs. 7 and 9 to that shown in Fig. 10, just raises valve plug 22 enough to lift stoppers clear of their openings in floor plate 79 but does not raise said plug high enough for its flutes 32 to bypass the oil.

The modified form of the device shown in Figs. 11 and 12 concerns chiefly the escape mechanism for clearing the floor of sludge and the control of openings for the escape of cleaning fluid or air from the chamber.

The row of rods 100 for lifting stoppers 25 free of the floor openings is set at right angles to the way the row of similar rods 23 in Figs. 1, 3 and 7 is set. The rods lift when the pressure in tube 71 exceeds the pressure of spring 31, Fig. 7. Transverse member 24 at the top of valve 31, Fig. 2, in the case of the modified design of Figs. 11 and 12 is set at right angles to that shown for said former figure to suit the location of rods 100. It is not shown in said latter figures but will be readily understood.

Valve stem 101 is rotatable in the bottom of sump casting 102. Outlet connection 91 leads from a passageway 96 in casting 102, the oil being received therefrom from the outlet side of filter walls 80, 81 and 82 as in Fig. 7. Inlet connection 69 leads oil under pressure into tube 71 from whence it is sent (not shown) through filter walls 80, 81 and 82 from their inlet side as in Fig. 7. Sump 104 is provided with a cleanout opening 67.

Valve stem 101 has a port 76 for the outlet 96 and outlet connection 91, and a port 110 for the inlet 69 and tube 71. Instead of one cam 72 as for valve stem 66, Figs. 7-10, valve stem 101 has two similar cams 104 and 105 for engaging the bottom of rods 106 and 107. The upper end of each of these rods is provided with a stopper 108 for controlling a corresponding opening in floor 103. The stoppers are normally held down in their openings by springs 109, cams 104 and 105 permitting. The way valve stem 101 is turned in Fig. 12 permits this and at the same time sets ports 76 and 110 in line with outlet 96 and inlet 69, respectively. Port 68 is set at right angles to cleanout opening 67 so that the latter is closed. When the sludge accumulates on floor 103, as was previously explained, rods 100 lift up stoppers 25 allowing the sludge to escape into sump 104. This clears the walls 80, 81 and 82 of the obstruction of the sludge allowing more normal flow of oil through them with a consequent reduction of pressure in the filter. The reduction in pressure allows stoppers 25 to move back to close their holes in floor 103.

With continued use of the filter, enough particles will stick to the walls 80, 81 and 82 to clog them, which particles will not settle, so that the pressure in the chamber will rise and operate the bypass as explained for Figs. 1 and 2. At this time the oil is no longer filtered. In order to clean the walls at this time, air or other cleaning fluid under pressure is introduced into air inlet 92 after valve stem 101 has been turned 90 degrees from that shown in Fig. 12. This turning lifts up rods 106 and 107 and stoppers 108 out of their openings in floor 103. It is to be noted, at this time that said turning does not effect stoppers 25, as was the case with Fig. 7, said latter stoppers keeping their openings in floor 103 closed. It is also to be noted that stoppers 108 and their openings only occur in inner compartment 85 before the first wall 80 passed through by the oil in its normal flow. With air sent through the filter walls in reverse direction, it must pass successively through walls 82, 81 and 80 and out the openings in the floor of inner compartment 85 from which stoppers 108 have been lifted. With valve stem 101 turned said 90 degrees, inlet opening 110 and outlet opening 76 are closed and cleanout opening 67 is opened, so that the air escapes only through the openings in floor 103 corresponding to stoppers 108, then passes through sump 104 and out cleanout opening 67 carrying sludge with it. While this takes place, stoppers 25 close their openings. It will be remembered that the interstices in walls 82, 81 and 80 increase in size successively for the walls as enumerated, so that the smaller particles carried away from wall 82 by the reverse flow of cleaning fluid will be able to pass through the larger interstices of walls 81 and 80, and the particles carried away from wall 81 will pass through the larger interstices of wall 80.

The filter wall of Fig. 13 is in the nature of a screen, the spacing and size of the filaments or wires shown for the small fragment of said wall being greatly enlarged. There are fewer horizontal filaments 111 than vertical filaments 112, per unit of area, which gives rise to elongated openings in the screen, as this screen is intended for use in the filter in a substantially vertical position. The elongated openings thus have their longer dimension extending up and down. A screen of this nature will permit particles more readily to settle therefrom.

I claim:

1. In an oil filtering device having a housing enclosing a chamber with an inlet for receiving oil under pressure and an outlet from the chamber a layer of filtering material in the chamber for filtering out particles of impurities from the oil on its way through, said layer being set at a sufficiently steep angle for filtered out particles to settle by gravity therefrom, a floor for receiving the particles settling from the layer, said layer being set in fixed relation to the floor, said floor having an opening therein for the escape of sludge accumulated on it by the settling of said particles, closure means for permitting and stopping the escape of the sludge from the opening, and oil pressure controlled means in the chamber actuated, when the oil pressure therein due to the clogging of said layer by sludge, exceeds a predetermined amount, to cause the closure means to permit escape of sludge, stopping such escape when said pressure is not in excess of said amount because of said escape.

2. An oil filtering device comprising a housing enclosing a chamber having an inlet from the pressure side of a lubricating system and an outlet to the system, a plurality of spaced substantially vertical walls of filtering material through which the oil is caused to pass successively, a floor below the walls for receiving by gravity particles filtered out by the walls, said housing being provided with a sump below the floor, the floor having openings therein for the escape into the sump of the sludge accumulated thereon by the settling of the particles, closure means for permitting and stopping the escape of sludge from said openings into the sump, pressure controlled means in the chamber actuated, when the oil pressure in the chamber exceeds a predetermined amount, due to the accumulation of sludge on the floor piling up to block enough of said walls to cause the closure means to permit the escape of sludge, and to stop such escape when said pressure drops to at most said amount upon said escape of sludge.

3. An oil filtering device comprising a housing enclosing a chamber having an inlet for receiving oil under pressure and an outlet from the chamber for the discharge of the oil therefrom, a plurality of spaced substantially vertical walls of filtering material, in the chamber, through which the oil is caused to pass successively, the interstices of successive walls decreasing in size, a floor below the walls, the particles of impurities in the oil being stopped by the successive walls in accordance with the size of the particles and settling to the floor, said walls and floor forming a plurality of compartments in the chamber, said floor having an opening for each compartment, closure means for permitting and stopping the escape from the openings of the sludge accumulated on the floor by the settling of said particles, and pressure controlled means in the chamber actuated, when the oil pressure in the chamber exceeds a predetermined amount due to a sufficient accumulation of sludge on the floor to block enough of the walls to cause the closure means to permit escape of sludge, stopping such escape when said pressure drops to at most said amount upon said escape of sludge.

4. In an oil filtering device having a housing enclosing a chamber with an inlet for receiving oil under pressure and an outlet from the chamber, a layer of filtering material in the chamber for filtering out particles of impurities from the oil on its way through, said layer being set at a sufficiently steep angle for the filtered out particles to settle by gravity therefrom, a floor for receiving the particles settling from the layer, said layer being mounted in fixed relation to the floor, said floor having an opening therein for the escape of sludge accumulated on it by the settling of said particles, a stopper seated in said opening, a spring actuated pressure valve mounted to be moved against its spring pressure when the oil pressure in the chamber, due to the clogging of said layer by a sufficient accumulation of sludge, overcomes the spring pressure, said stopper being connected to the valve for movement with it, the movement of the valve against its spring pressure moving the stopper from the opening allowing thereby the escape of sludge from the floor, said valve moving back under the influence of its spring oil pressure when the pressure in the chamber is insufficient to overcome the spring pressure, effecting the seating of the stopper in the opening preventing thereby the escape of sludge.

5. An oil filtering device comprising a housing enclosing a chamber having an inlet from the pressure side of a lubricating system and an outlet to the system, a layer of filtering material in the chamber for filtering out impurities from the oil on its way through, said layer being set at a sufficiently steep angle for the filtered out impurities to settle by gravity therefrom, a floor for receiving the impurities settling from the layer, said layer being mounted in fixed relation to the floor, said housing being provided with a sump below the floor, the floor having an opening therein for the escape into the sump of the sludge accumulated thereon by the settling of the impurities, a pressure controlled valve in the chamber mounted to move up and down therein, the valve normally being in substantially its lowest position, a stopper connected to the valve, closing the floor opening when the valve is in said position, the accumulation of sludge on the floor, by blocking off the filter layer, effecting an increase in oil pressure in the chamber thereby raising the valve and stopper, the raising of the stopper freeing the opening for the escape of the sludge into the sump.

6. An oil filtering device comprising a housing enclosing a chamber, a transverse roof member in the chamber at a substantial distance below the top of the housing, a space being provided thereby above said member, a transverse floor member in the chamber at a substantial distance above the bottom of the housing, a sump being provided thereby below the floor member, a plurality of substantially cylindrical substantially vertical walls of filtering material in spaced relation successively within each other, the walls extending between the floor and roof members forming therewith a plurality of compartments successively within each other, an inlet for the chamber for receiving the oil under pressure, said inlet leading the oil into the inner compartment, the oil passing successively outwardly through the several compartments, an opening being provided in the roof member into the space above it for receiving the oil escaping from the outermost wall, an outlet from the housing for discharging the oil from said space, the interstices of the successive walls decreasing in size from the inner to the outermost wall, the particles of impurities in the oil being stopped by the successive walls in accordance with the size of the particles and settling to the floor member forming sludge thereon, the floor member having at least one opening for each compartment, closure means for permitting and stopping the escape of sludge from said openings into the sump and pressure controlled means in the chamber actuated when the oil pressure in the chamber exceeds a predetermined amount due to a sufficient accumulation of sludge on the floor to block enough of the walls to cause the closure means to permit the escape of sludge, stopping such escape when the pressure in the chamber drops to at most said amount upon said escape of sludge.

7. In an oil filtering device having a housing enclosing a chamber with an inlet for receiving oil under pressure and an outlet from the chamber, a layer of filtering material in the chamber for filtering out particles of impurities from the oil on its way through, said layer being set at a sufficiently steep angle for the filtered out particles to settle by gravity therefrom, a floor plate having a plurality of openings therein, a closure plate mounted to slide parallel and next to the floor plate, said closure plate having openings corresponding to those in the floor plate, said plates being located in the chamber to receive the particles settling from said layer, said plates permitting the escape therefrom of sludge accumulated thereon by the settling of said particles when their holes are set in register and stopping said escape when they are out of register, and means actuated in accordance with the oil pressure in the chamber for controlling the setting of the closure plate.

8. An oil filtering device comprising a housing enclosing a chamber having an inlet opening for receiving oil under pressure and an outlet opening from the chamber for the discharge of the oil therefrom, a tube extending up into the chamber from said inlet opening, said tube having an opening in its side for the discharge of the oil, a substantially vertical wall of filtering material through which the oil from said tube opening is caused to pass, a floor below the wall, the particles of impurities in the oil on its passage through the wall being stopped by said wall and settling to the floor, said floor having an opening therein for the escape of sludge accumulated on top of it by the settling of the particles, a valve plug slidably mounted in the tube above the opening therein, a spring normally holding the valve plug in its lowest position, a transverse member attached to said plug, a stopper for the opening in the floor depending from said member, said stopper closing the floor opening when the valve plug is in its lowest position, the clogging of said wall by filtered out impurities inducing an increase in oil pressure in the tube below the valve plug, raising the latter against said spring and thereby lifting the stopper from the floor opening for the escape of sludge from the floor.

9. An oil filtering device comprising a housing enclosing a chamber having an inlet opening for receiving oil under pressure and an outlet opening from the chamber for the discharge of oil therefrom, a plurality of substantially cylindrical substantially vertical walls of filtering material in spaced relation successively within each other forming between them a plurality of compartments successively within each other, a transverse roof member in the chamber at a substantial distance below the top of the housing, an escape space for oil being provided thereby above said member, said space leading to the outlet opening, said member forming the top of the compartments, a transverse floor member in the chamber at a substantial distance above the bottom of the housing, a sump being provided thereby below the floor member, said floor member forming the bottom of said compartments and having at least one opening into the sump for each compartment, the interstices in the successive walls decreasing in size successively from the inner to the outer wall, a tube extending up into the chamber from said inlet opening into the inner compartment, said tube having an opening in its side for discharging oil into the inner compartment, the oil passing through from the inner to the outer compartment, then through the outer wall and up into the escape chamber, the particles of impurities in the oil being stopped by the successive walls in accordance with the size of the particles and settling to the floor forming sludge thereon, a valve member slidably mounted in the tube above said opening therein, the upper part of the valve member extending into the escape space, a spring normally holding the valve member in its lowest position, a stopper for each floor opening, a rod for each stopper attached to the valve member in the escape space, said rods extending down through the roof member and compartments from the valve member, each rod having a stopper mounted on its lower part, the stoppers normally closing the floor openings when the valve is in its lowest position, the clogging of the walls by impurities causing an increase in pressure in said tube raising the valve member and with it the stoppers from the floor openings, allowing escape of the sludge therethrough into the sump.

10. An oil filtering device comprising a housing enclosing a chamber having an inlet for receiving oil under pressure and an outlet from the chamber for the discharge of the oil therefrom, a layer of filtering material in the chamber for filtering out impurities from the oil on its normal way through, said layer being set at a sufficiently steep angle for the filtered out impurities to settle by gravity therefrom, a floor for receiving the impurities settling from the layer, said housing being provided with a sump below the floor, said sump being provided with a cleanout opening, the floor having provision for the escape into the sump of the sludge accumulated thereon by the settling of the impurities, closure means for permitting and stopping the escape of sludge from the floor into the sump, pressure controlled means in the chamber actuated, when the oil pressure in the chamber exceeds a predetermined amount due to the accumulation of sludge on the floor blocking off the filtering means, to cause the closure means to permit the escape of sludge, and to stop such escape when enough sludge has passed into the sump to bring down the pressure to at most said amount, a valve combination having parts engaging the sump cleanout opening, the inlet, the outlet and said closure means, said combination when set in inoperative position opening the sump cleanout opening and shutting off said inlet and outlet thereby cutting off the normal flow of oil, and actuating the closure means to permit the passage of sludge through the floor into the sump, said combination when set in operative position permitting said normal flow of oil, the closure means to stop the escape of sludge through the floor into the sump, and closing said cleanout opening, and means for introducing cleaning fluid under pressure into the chamber on the outlet side of said layer, and when said combination is set in inoperative position enabling said fluid to pass through the layer in reverse direction from normal, escaping through the floor to the sump and out the cleanout opening.

11. An oil filtering device comprising a housing enclosing a chamber having an inlet from the pressure side of a lubricating system and an outlet to the system, a tube extending up into the chamber from the inlet having an opening in its side for the discharge of oil, a substantially vertical wall of filtering material through which the oil from said opening is caused to pass, a floor beneath the wall at a substantial distance above the bottom of the housing providing a sump thereby below the floor, said sump being provided with a cleanout opening, the impurities in the oil on its passage through the wall being stopped by said wall and settling to the floor, said floor having an opening therein for the escape of sludge accumulated on top of it by the settling of the impurities, a valve plug slidably mounted in the tube above the opening therein, said plug being held normally in substantially its lowest position, a stopper for the floor opening connected to the valve plug, the clogging of said wall inducing an increase in pressure in the tube below the valve plug, raising the latter and moving the stopper away from the floor opening allowing the escape of sludge into the sump thereby decreasing the pressure in the tube, a valve stem, having a plurality of ports therein, rotatably mounted in the housing at the bottom of the sump, a port being provided opposite the inlet, the outlet and the cleanout opening, a rod in the tube extending between the valve plug and said stem at the cleanout port, said stem when rotated into inoperative position shutting off the inlet and outlet, opening the cleanout opening and raising the rod to push up the valve plug, said stem at the cleanout port being formed to move the rod when rotated, the setting of the stem in inoperative position cutting off the flow of oil between the chamber and the lubricating system and moving the stopper away from the floor opening permitting the sludge to escape into the sump, said stem when set in operative position permitting the flow between the chamber and lubricating system, the stopper to close the floor opening and closing the cleanout opening, and means for introducing cleaning fluid under pressure into the chamber on its outlet side, and when said stem is set in inoperative position to enable said fluid to pass through the filtering layer in reverse direction from said oil flow, escaping through the opening in the floor to the sump and out the cleanout opening.

12. An oil filtering device comprising a housing enclosing a chamber having an inlet for receiving oil under pressure and an outlet from the chamber for the discharge of the oil therefrom, a plurality of spaced substantially vertical walls of filtering material in the chamber through which the oil coming in from the inlet is caused normally to flow successively, the interstices of successive walls decreasing in size, a floor below the walls, the particles of impurities in the oil being stopped by the successive walls in accordance with the size of the particles and settling to the floor, said housing being provided with a sump below the floor, the sump being provided with a cleanout opening, said walls and floor forming a plurality of sucessive compartments in the chamber, the floor having provision for the escape from each compartment into the sump of the sludge accumulated thereon by the settling of the particles, closure means for permitting and stopping said escape of sludge, pressure controlled means in the chamber actuated, when the oil pressure in the chamber exceeds a predetermined amount due to the accumulation of sludge on the floor blocking off the walls, to cause the closure means to permit said escape of sludge, and to stop such escape when enough sludge has escaped to bring down the pressure to at most said amount, a valve combination having parts engaging the closure means, the sump cleanout opening, the inlet and the outlet, said combination when set in inoperative position opening the sump cleanout opening and shutting off said inlet and outlet thereby cutting off the normal flow of oil, and actuating the closure means to permit the passage of sludge substantially only through that portion of the floor on the inlet side of the wall with the largest interstices, and means for introducing cleaning fluid under pressure into the chamber on the outlet side of said walls, and when said combination is set in inoperative position enabling said fluid to pass through the successive walls in reverse direction from said normal flow, escaping through said portion of the floor to the sump, and out of the latter through the cleanout opening.

13. In an oil filtering device having a housing enclosing a chamber with an inlet for receiving oil under pressure and an outlet from the chamber, a substantially vertically extending wall of filtering material in the chamber, a substantially horizontally extending layer of filtering material adjacent the wall at the upper end of the latter, the oil being caused to pass through the wall substantially horizontally and then in an upward direction through the layer, for filtering particles of impurities from the oil, a floor below said wall and a substantial distance below said layer the filtered out particles settling by gravity from the wall and layer and forming sludge on the floor, said floor having an opening therein for the escape of sludge separated out by the wall, closure means permitting and stopping the escape of the sludge from the floor through said opening, means, movably mounted with respect to the wall and operated in accordance with the oil pressure in the chamber, actuating the closure means to permit the escape of the sludge from the floor through the opening when said pressure rises to a predetermined amount due to the blocking of said wall, and actuating the closure means to stop the escape of the sludge from the wall through the opening when the pressure is less than said amount, said floor having another opening in it for the portion of it catching the sludge filtered out by said layer, and closure means for said latter opening for permitting and stopping the escape of the sludge therefrom.

14. In an oil filtering device having a housing enclosing a chamber with an inlet for receiving oil under pressure and an outlet from the chamber, a plurality of substantially cylindrical substantially vertical walls of filtering material in the chamber in spaced relation successively within each other forming between them a plurality of compartments successively within each other, a floor extending below the walls having at least one opening therein for each compartment, the oil on its way through the device passing through one wall after the other in a given direction, the interstices in the walls decreasing in size for successive walls in said direction, the particles of impurities in the oil reaching each wall being stopped in accordance with its size and settling to the floor forming sludge thereon, closure means for permitting and stopping the escape of sludge from said openings, and pressure, controlled means in the chamber actuated when the oil pressure in the chamber exceeds a predetermined amount, due to a sufficient accumulation of sludge on the floor to block enough of the walls, to cause the closure means to permit the escape of sludge, stopping such escape when the pressure in the chamber drops to at most said amount upon said escape of sludge.

15. An oil filtering device having the oil forced therethrough under pressure, comprising a substantially cylindrical casing with an inlet for receiving oil under pressure and an outlet from the casing, a plurality of substantially cylindrical substantially vertical walls of filtering material in the casing, said walls being in spaced relation substantially concentrically within each other, the outer wall thereof being spaced from the casing and substantially concentric therewith, said walls and casing forming a plurality of compartments, a ring of filtering material over the top of the compartment between the outer wall and the casing, a floor beneath the walls and extending to the casing, said floor having at least one opening therein for each compartment, the interstices in the walls decreasing in size, successively from the inner to the outer wall, the interstices in the ring being smaller still than those in the outer wall, the oil being sent through the device passing through from the inner to the outer compartment and out through the ring over the latter, the particles of impurities in the oil being stopped by the successive walls and ring in accordance with the size of the particles and settling to the floor forming sludge thereon, closure means for permitting and stopping the escape of sludge from said openings except the opening for the compartment between the outer wall and the casing, means operated in accordance with the oil pressure in the innermost compartment, actuating the closure means to permit the escape of sludge from said openings when said latter pressure rises to a predetermined amount due to the blocking of said walls by the piling of the sludge on the floor, and actuating the closure means to close said openings when the pressure is less than said amount, and a manually controlled outlet for the escape of sludge from the opening for the compartment between the outer wall and the casing.

16. An oil filtering device comprising a housing enclosing a chamber having an inlet for receiving oil under pressure and an outlet for the oil from the chamber, a plurality of spaced substantially vertical walls of filtering material forming compartments in the chamber, the oil coming from the inlet being caused normally to flow through said walls and out the outlet filtering out the particles of impurities thereby, said particles settling down from the walls, means for discharging from the compartments the sludge accumulated therein from the settlement of said particles, pressure controlled means in the chamber actuated, when the oil pressure in the chamber exceeds a predetermined amount due to the accumulation of sludge in the compartments, to cause said discharge means to permit the escape of sludge from the compartments, means for discharging from the chamber the sludge received from the compartments, a valve combination having parts engaging the inlet, outlet and said latter discharge means for cutting off said inlet and outlet and permitting the discharge of sludge from the chamber out through said latter discharge means when set in inoperative position, and additional inlet means connected to the chamber on the outlet side of said walls for receiving cleaning fluid under pressure, said fluid when so received passing through the walls in reverse direction from normal, said fluid being enabled to pass out from the chamber when said parts are set in inoperative position, said parts when set in operative position permitting the normal oil flow through the inlet and outlet and cutting off the latter discharge means.

17. An oil filtering device comprising a housing enclosing a chamber having an inlet for receiving oil under pressure and an outlet for the oil from the chamber, a plurality of spaced substantially vertical walls of filtering material in the chamber through which the oil coming in from the inlet is caused normally to flow successively, the interstices of successive walls decreasing in size, a floor below the walls, the particles of impurities in the oil being stopped by the successive walls in accordance with the size of the particles and settling to the floor, said housing being provided with the sump below the floor, the sump being provided with a cleanout opening, said walls and floor forming a plurality of successive compartments in the chamber, said floor having at least one opening therein for each compartment for the escape into the sump of the sludge accumulated thereon by the settling of the particles, closure means for said openings, pressure controlled means in the chamber actuated, when the oil pressure in the chamber exceeds a predetermined amount due to the accumulation of sludge on the floor blocking the walls, to cause the closure means to permit said escape, and to stop such escape when enough sludge has escaped to clear the walls and thereby bring down the pressure to at most said amount, the floor of the first compartment passed through by the oil in its normal flow having at least one additional opening, a stopper normally closing said additional opening, a valve combination having parts in contact with said inlet, outlet, the sump at said cleanout opening, and said latter stopper, said combination, when set in inoperative position, cutting off the inlet and outlet, permitting the discharge of the sludge from the sump and withdrawing the latter stopper from its opening, and inlet means for receiving cleaning fluid under pressure connected to the chamber on the outlet side of said walls, said cleaning fluid, when the combination is set in inoperative position being permitted to pass through the successive walls in reverse direction from said normal flow, escaping through said additional opening into the sump and out the latter through its cleanout opening, said valve combination when set in operative position permitting the normal flow of oil into the chamber from the inlet and out of the chamber from the outlet, closing off the sump cleanout opening, and causing the stopper to close said additional opening.

MORRIS KATCHER.